(12) United States Patent
Christensen et al.

(10) Patent No.: US 8,688,823 B1
(45) Date of Patent: Apr. 1, 2014

(54) ASSOCIATION OF NETWORK TRAFFIC TO ENTERPRISE USERS IN A TERMINAL SERVICES ENVIRONMENT

(75) Inventors: Mitch Christensen, Livermore, CA (US); Wei Gao, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 1070 days.

(21) Appl. No.: 12/605,262

(22) Filed: Oct. 23, 2009

Related U.S. Application Data

(60) Provisional application No. 61/108,478, filed on Oct. 24, 2008.

(51) Int. Cl.
*G06F 15/173* (2006.01)
*G06F 11/00* (2006.01)

(52) U.S. Cl.
USPC .............................................. 709/224; 726/22

(58) Field of Classification Search
None
See application file for complete search history.

(56) References Cited

U.S. PATENT DOCUMENTS

| | | | |
|---|---|---|---|
| 6,219,706 B1 * | 4/2001 | Fan et al. ...................... | 709/225 |
| 6,430,183 B1 | 8/2002 | Satran et al. | |
| 6,871,284 B2 * | 3/2005 | Cooper et al. .................... | 726/1 |
| 6,983,379 B1 * | 1/2006 | Spalink et al. .................. | 705/50 |
| 7,020,082 B2 * | 3/2006 | Bhagavath et al. ........... | 370/230 |
| 7,215,637 B1 | 5/2007 | Ferguson et al. | |
| 7,433,943 B1 * | 10/2008 | Ford .............................. | 709/223 |
| 7,941,827 B2 * | 5/2011 | John et al. .......................... | 726/4 |
| 7,986,629 B1 | 7/2011 | Ferguson et al. | |
| 8,024,779 B2 * | 9/2011 | John et al. ......................... | 726/4 |
| 8,166,554 B2 * | 4/2012 | John ................................ | 726/26 |
| 8,214,875 B2 * | 7/2012 | John et al. ......................... | 726/1 |
| 2001/0039579 A1 * | 11/2001 | Trcka et al. ................... | 709/224 |
| 2003/0172292 A1 | 9/2003 | Judge | |
| 2004/0107360 A1 * | 6/2004 | Herrmann et al. ............ | 713/201 |
| 2005/0050338 A1 * | 3/2005 | Liang et al. .................... | 713/188 |
| 2005/0193429 A1 | 9/2005 | Demopoulos et al. | |
| 2005/0251510 A1 | 11/2005 | Billingsley et al. | |
| 2006/0236370 A1 * | 10/2006 | John et al. ......................... | 726/1 |
| 2007/0061433 A1 | 3/2007 | Reynolds | |
| 2007/0094265 A1 | 4/2007 | Korkus | |
| 2007/0157286 A1 | 7/2007 | Singh et al. | |
| 2007/0174905 A1 | 7/2007 | Martherus et al. | |
| 2011/0264822 A1 | 10/2011 | Ferguson et al. | |

OTHER PUBLICATIONS

U.S. Appl. No. 12/605,278, specification, claims and drawings as filed Oct. 23, 2009.
U.S. Appl. No. 12/605,268, specification, claims and drawings as filed Oct. 23, 2009.
U.S. Appl. No. 12/605,287, specification, claims and drawings as filed Oct. 23, 2009.
Final Rejection for U.S. Appl. No. 12/605,268, mailed Aug. 14, 2012.
Final Rejection for U.S. Appl. No. 12/605,278, mailed Aug. 30, 2012.

* cited by examiner

*Primary Examiner* — Ranodhi Serrao

(57) ABSTRACT

A solution for associating network traffic to enterprise users in a terminal services environment includes, at a network device configured as a terminal server, monitoring outbound network connections. If an outbound network connection is detected, a record is created indicating an association between the network connection and an enterprise user that initiated the network connection. The record is reported to a remote packet monitor which maintains a permanent log of the record. The permanent log may be used for tagging observed network traffic with an owning user.

21 Claims, 4 Drawing Sheets

ASSOCIATION OF NETWORK TRAFFIC TO ENTERPRISE USERS IN A TERMINAL SERVICES ENVIRONMENT

CROSS REFERENCE TO RELATED APPLICATIONS

This application claims the benefit of provisional application No. 61/108,478 filed Oct. 24, 2008, entitled "Systems and Methods for Network Traffic Processing," the disclosure of which is incorporated herein in its entirety by reference.

This application is related by subject matter to the following commonly-assigned applications: patent application Ser. No. 12/605,278 filed Oct. 23, 2009, entitled, "Dynamic Packet Filtering;" and patent application Ser. No. 12/605,287 filed Oct. 23, 2009, granted Jun. 11, 2013 as U.S. Pat. No. 8,463,730, and entitled "Rapid Evaluation of Numerically Large Complex Rules Governing Network and Application Transactions."

FIELD OF THE INVENTION

The present invention relates to the field of computer science. More particularly, the present invention relates to association of network traffic to enterprise users in a terminal services environment.

BACKGROUND OF THE INVENTION

A thin client (sometimes also called a lean or slim client) is a client computer or client software in client-server architecture networks which depends primarily on a central server for processing activities, and mainly focuses on conveying input and output between the user and the remote server. In contrast, a thick or fat client does as much processing as possible and passes only data for communications and storage to the server.

Terminal server hardware and software solutions allow one or more enterprise users to share computing and application resources running on a 'terminal server' which sits between the client workstation and back-end servers and applications. One of the primary benefits of terminal service solutions is the ability to share, and as such, make more efficient use of computational resources. Unfortunately, sharing of the network resources which provide access to back-end resources within a terminal server obscures the identity of the original user with regard to network traffic between the terminal server(s) and the back-end resources. The effect is that the network traffic generated by several client workstations are aggregated together into a single (or sometimes multiple) network data stream running between the terminal server(s) and the back-end resources. Accordingly, a need exists in the art for an improved solution for associating network traffic to enterprise users.

SUMMARY OF THE INVENTION

A solution for associating network traffic to enterprise users includes, at a network device configured as a terminal server, monitoring outbound network connections. If an outbound network connection is detected, a record is created indicating an association between the network connection and an enterprise user in a terminal services environment that initiated the network connection. The record is reported to a remote packet monitor which maintains a permanent log of the record. The permanent log may be used for tagging observed network traffic with an owning user.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
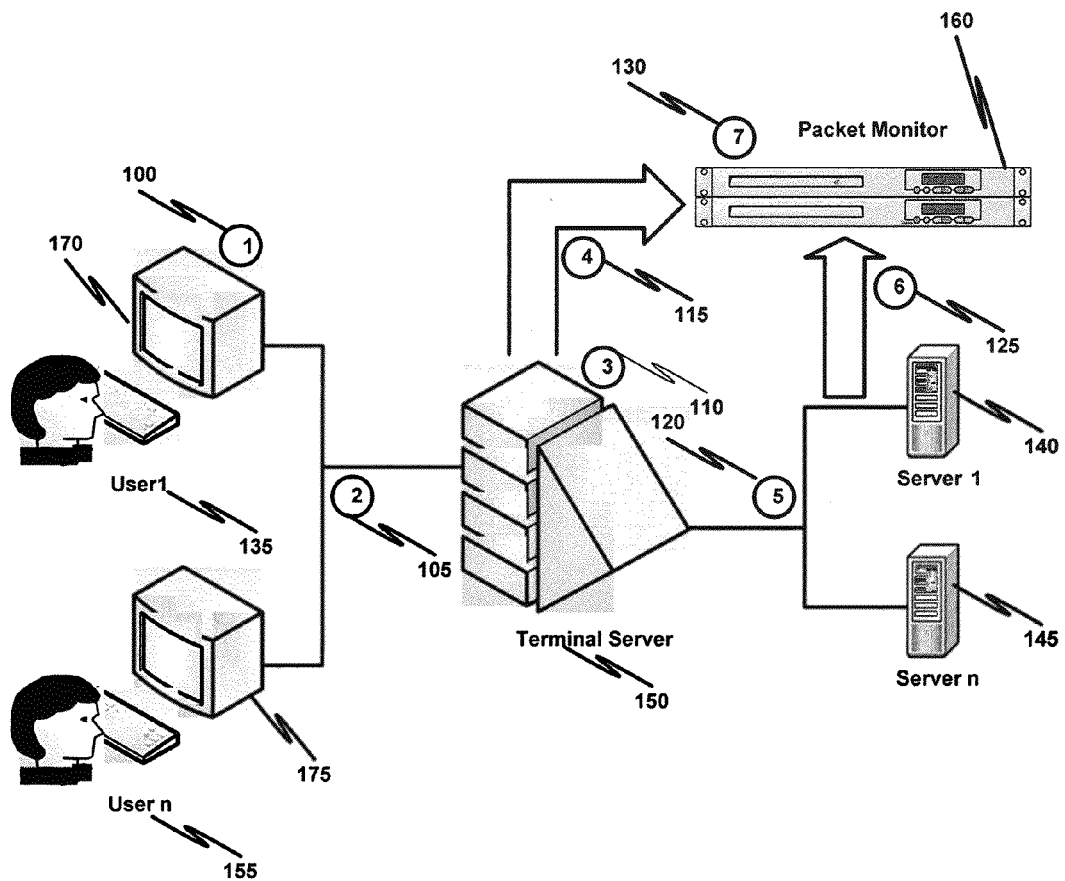
FIG. 1 is a block diagram that illustrates a system for associating network traffic to enterprise users in accordance with one embodiment of the present invention.

Embodiments of the present invention are described herein in the context of associating network traffic to enterprise users. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks (LANs), wide area networks (WANs), metro area networks, residential networks, corporate networks, inter-networks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here.

In the context of the present invention, the term "identifier" describes an ordered series of one or more numbers, characters, symbols, or the like. More generally, an "identifier" describes any entity that can be represented by one or more bits.

In the context of the present invention, the term "distributed" describes a digital information system dispersed over multiple computers and not centralized at a single location.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

In the context of the present invention, the term "network interface" describes the means by which users access a network for the purposes of communicating across it or retrieving information from it.

In the context of the present invention, the term "system" describes any computer information and/or control device, devices or network of devices, of hardware and/or software, comprising processor means, data storage means, program means, and/or user interface means, which is adapted to communicate with the embodiments of the present invention, via one or more data networks or connections, and is adapted for use in conjunction with the embodiments of the present invention.

It should be noted that the system for association network traffic to enterprise users in a terminal services environment is illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

Example embodiments of the present invention provide accurate association of user identity in environments that include terminal services solutions which otherwise obscure the ownership of network traffic.

Example embodiments of the present invention include a component (agent) installed on each terminal server which monitors a current set of enterprise users connected to the terminal server and correlates each of the enterprise users to the network traffic leaving the network interface of the terminal server bound for one or more back end resources. The association information is delivered by the agent to a packet monitoring system to serve as input to a set of user association algorithms which maintain a permanent record of all observed network traffic and its relationship to the originating enterprise user(s).

Embodiments of the present invention include two cooperating system components: a Windows terminal server agent (WTSA) and a centralized user association engine (UAE). The WTSA is installed on each Windows terminal server to be monitored. The UAE is a centralized component of the packet monitoring system which services one or more WTSA instances.

Network Architecture

FIG. 1 is a block diagram that illustrates a system for associating network traffic to enterprise users in accordance with one embodiment of the present invention. As shown in FIG. 1, at 100 enterprise users (135, 155) execute a thin-client application on a client workstation (170, 175). At 105, the thin-client application makes a network connection from the client workstation (170, 175) to a remote terminal server 150. At 115, the WTSA installed on each terminal server 150 monitors each enterprise user's outbound network activity on the terminal server 150 and reports network related events to the UAE running within the packet monitor 160. At 120, outbound network traffic originating from user activity on the terminal server 150 flows between the terminal server 150 and back-end resources (140, 145). Network traffic between the terminal server 150 and the back-end resources (140, 145)

is monitored by the packet monitor 160 and correlated to the originating enterprise user (135, 155) via the UAE running within the packet monitor 160.

Logical Process Diagram and Associated Data Flow

Figure 2:
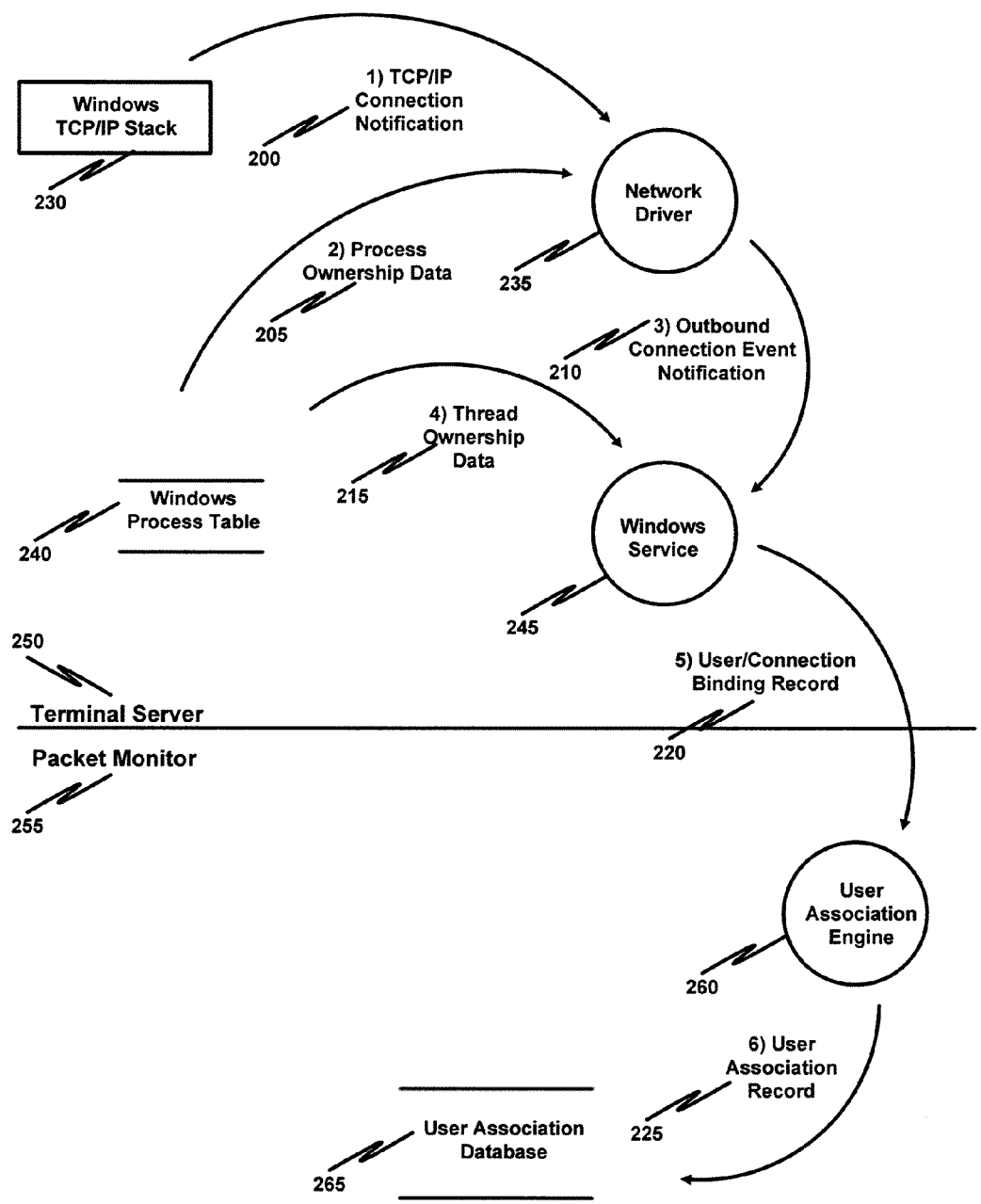
FIG. 2 is a process diagram and the associated data flow of a network driver within a terminal services agent architecture in accordance with one embodiment of the present invention.

FIG. 2 is a process diagram and the associated data flow of a network driver within a terminal services agent architecture in accordance with one embodiment of the present invention. The processes illustrated in FIG. 2 may be implemented in hardware, software, firmware, or a combination thereof. At 200, whenever a process on the terminal server opens a network connection to a remote host, the Windows TCP/IP stack notifies the network driver of the connection. At 205, once the network driver 235 has been notified of the new TCP/IP connection, the network driver 235 accesses the Windows process table 240 to identify the owner (user) of the process that opened the connection. At 210, the network driver 235 then constructs a record of the TCP/IP connection details (source IP address, source port, destination IP address, destination port and protocol), process ID and user ID and delivers that information to the Windows Service 245.

Under certain circumstances a single TCP/IP connection will be shared by more than one user. In such cases, at 215 the Windows service 245 must also consult the Windows process table 240 in order to determine which user initiated the transaction based on the thread ID. Once the user originating the transaction has been uniquely identified, at 220 the Windows service 245 constructs a record of the TCP/IP connection details, data and time and originating user for the transaction and adds the user/connection binding data to a queue for subsequent delivery to the UAE 260 running within the remote packet monitor system 255. The Windows service 245 is responsible for guaranteeing delivery of the user/connection binding data to the UAE 260. Once the UAE component 260 within the packet monitor system 255 receives the user/connection binding record from the Windows service component 245 of the WTSA, at 225 the UAE component 260 creates a user association record that binds the TCP/IP connection details with the originating user and inserts it into the packet monitor user association database 265 as a permanent record.

An example of this process is as follows. An enterprise user connects to a terminal server running an instance of the WTSA and launches an instance of a web browser. The user then enters a URL in the address bar, say 'http://www.google.com/'. The browser process responds by opening a TCP connection from the terminal server to a remote Google server on the interne. The establishment of this network connection to the Google server will cause the Windows TCP/IP stack 230 to notify the network driver 235 of the successful connection to the remote server (1). The network driver 235 then looks up in the Windows process table 240 the owner of the process that initiated the connection (2). The network driver 235 then constructs an outbound connection event record and sends it to the Windows service (3). Since this connection is not shared with any other users, the Windows service 245 will not need to perform a thread-based user lookup in the Windows process table (4). The Windows service 245 then constructs a user/connection event record which comprises the TCP/IP connection details, date and time and uniquely identifies the originating user of the transaction and delivers that user/connection event record 220 to the UAE 260 running within the remote packet monitor system (5). The UAE 260 constructs a user association record 225 that maps the originating user to the source IP address and port at the time specified and inserts the user association record into the user association database 265 as a permanent record of the event.

Windows Terminal Server Agent (WTSA)

Figure 3:
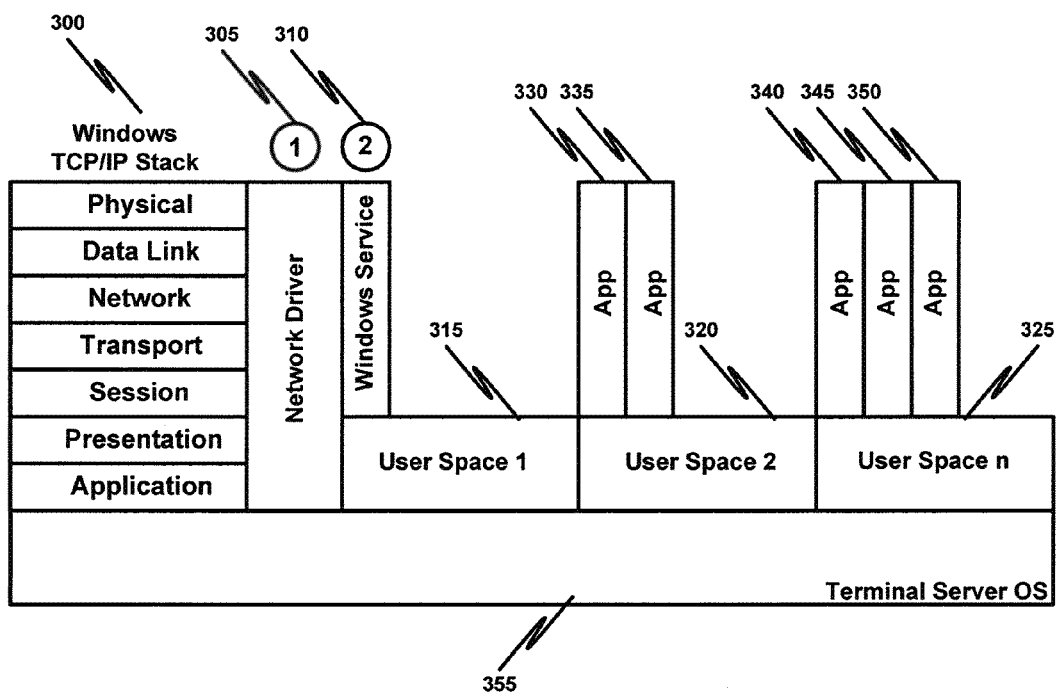
FIG. 3 is a block diagram that illustrates an architecture of a windows terminal server agent deployed within each windows terminal server in accordance with one embodiment of the present invention.

FIG. 3 is a block diagram that illustrates an architecture of a windows terminal server agent deployed within each windows terminal server in accordance with one embodiment of the present invention. As shown in FIG. 3, the WTSA is installed on each Windows Terminal Server to be monitored. The WTSA comprises two separate functional elements: a network driver 305 and a Windows Service process 310.

Installation of the WTSA on a target Windows terminal server results in the deployment of a Windows network driver 305 which monitors outbound network (TCP/IP) connections and a Windows service component 310 which receives notification of new outbound network connections from the network driver 305, looks up the user identification information associated with the outbound network connection and reports the association of the enterprise user and outbound network connection to the UAE running remotely in the packet monitor system.

Network Driver

According to one embodiment of the present invention, network driver (ND) 305 is an operating system-level component which attaches to the terminal server's TCP/IP stack and monitors the creation of new outbound TCP/IP connections. Each time a new outbound TCP/IP connection is observed, the ND delivers an event which fully describes the connection to the Windows Service for subsequent processing Windows Service According to another embodiment of the present invention, Windows service is a background process which continually waits for incoming outbound connection events from the Network Driver. When an outbound connection event is received, the process ID associated with the connection event is used to lookup the user data in the Windows process table. A new user/port binding event is created which contains details on the network event (TCP/IP address & port) and user data. This user/port binding event is then delivered over a network connection to the UAE running within the remote packet monitor system.

User Association Engine (UAE)

The UAE component within the packet monitor system maintains a network connection to each remote WTSA. Each time the Windows service component of a remote WTSA delivers a user/port binding event, the UAE creates a user association record which provides a permanent record of the association between the enterprise user and the traffic emanating from the identified source port on the Terminal Server. The information stored in the user association database may be used to tag observed network traffic data with an owning user.

Figure 4:
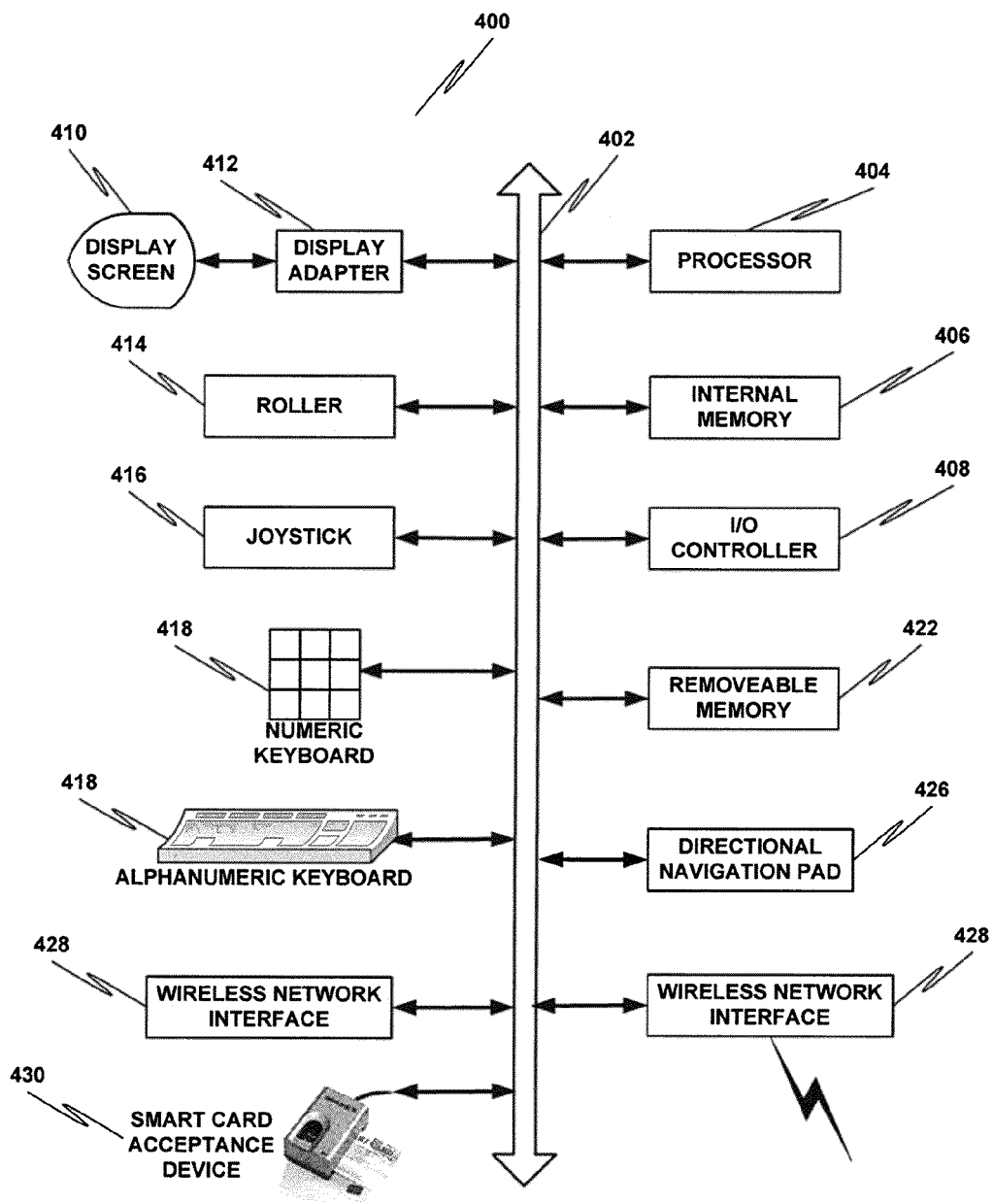
FIG. 4 is a block diagram of a computer system suitable for implementing aspects of the present invention.

FIG. 4 depicts a block diagram of a computer system 400 suitable for implementing aspects of the present invention. As shown in FIG. 4, system 400 includes a bus 402 which interconnects major subsystems such as a processor 404, an internal memory 406 (such as a RAM), an input/output (I/O) controller 408, a removable memory (such as a memory card) 422, an external device such as a display screen 410 via display adapter 412, a roller-type input device 414, a joystick 416, a numeric keyboard 418, an alphanumeric keyboard 418, directional navigation pad 426, smart card acceptance device 430, and a wireless interface 420. Many other devices can be connected. Wireless network interface 420, wired network interface 428, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 4 to be present to practice the present invention. Furthermore, the devices and subsystems may be interconnected in different ways from that shown in FIG. 4. Code to implement the present invention may be operably disposed in internal memory 406 or stored on storage media such as removable memory 422, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory).

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. At a network device configured as a terminal server executing at least one process, a computer implemented method comprising:
monitoring for an outbound network connection;
identifying a process, from within the processes executing on the terminal server, that initiated the outbound network connection;
accessing an operating system process table to identify an entry in the table that corresponds to the process;
extracting information from the entry to identify a user that owns the process;
creating a record indicating an association between the outbound network connection and the user; and
reporting the record to a remote packet monitor.

2. The method of claim 1 wherein the monitoring is performed by a network driver of the terminal server.

3. The method of claim 1 wherein the creating and the reporting are performed by a Windows service of the terminal server.

4. The method of claim 1 wherein
the creating comprises using a process ID to identify the entry in the the operating system process table; and
the record indicates the user and a source port of the terminal server used to make the network connection.

5. The method of claim 4 wherein the creating further comprises using a thread ID to uniquely identify the entry.

6. The method of claim 4 wherein the record further indicates date and time information.

7. The method of claim 1, further comprising tagging observed network traffic data with an owning user based at least in part on the record reported to the remote packet monitor.

8. A network device configured as a terminal server executing at least one process comprising:
a memory; and
one or more processors configured to:
monitor for an outbound network connection;
identify a process, from within the processes executing on the terminal server, that initiated the outbound network connection;
access an operating system process table to identify an entry in the table that corresponds to the process;
extract information from the entry to identify a user that owns the process;
create a record indicating an association between the outbound network connection and an user; and
report the record to a remote packet monitor.

9. The network device of claim 8 wherein the monitoring is performed by a network driver of the terminal server.

10. The network device of claim 8 wherein the creating and the reporting are performed by a Windows service of the terminal server.

11. The network device of claim 8 wherein
the creating comprises using a process ID to identify the entry in the the operating system process table; and
the record indicates the user and a source port of the terminal server used to make the network connection.

12. The network device of claim 11 wherein the creating further comprises using a thread ID to uniquely identify the entry.

13. The network device of claim 11 wherein the record further indicates date and time information.

14. The network device of claim 8, further configured to tag observed network traffic data with an owning user based at least in part on the record reported to the remote packet monitor.

15. A non-transitory machine readable storage medium embodying a program of instructions executable by a machine configured as a terminal server executing at least one process to perform a method, the method comprising:
monitoring for an outbound network connection;
identifying a process, from within the processes executing on the terminal server, that initiated the outbound network connection;
accessing an operating system process table to identify an entry in the table that corresponds to the process;
extracting information from the entry to identify a user that owns the process;
creating a record indicating an association between the outbound network connection and the user; and
reporting the record to a remote packet monitor.

16. The non-transitory machine readable storage medium of claim 15, further comprising tagging observed network traffic data with an owning user based at least in part on the record reported to the remote packet monitor.

17. The non-transitory machine readable storage medium of claim 15 wherein the monitoring is performed by a network driver of the terminal server.

18. The non-transitory machine readable storage medium of claim 15 wherein the creating and the reporting are performed by a Windows service of the terminal server.

19. The non-transitory machine readable storage medium of claim 15 wherein:
the creating comprises using a process ID to identify the entry in the operating system process table; and
the record indicates the user and a source port of the terminal server used to make the network connection.

20. The non-transitory machine readable storage medium of claim 19 wherein the creating further comprises using a thread ID to uniquely identify the entry.

21. The non-transitory machine readable storage medium of claim 19 wherein the record further indicates date and time information.

* * * * *